(12) United States Patent
Ishigami et al.

(10) Patent No.: US 8,416,337 B2
(45) Date of Patent: Apr. 9, 2013

(54) IMAGE PROCESS APPARATUS AND METHOD FOR PROCESSING A COLOR IMAGE SIGNAL

(75) Inventors: Koichiro Ishigami, Kanagawa (JP); Hirofumi Nomura, Saitama (JP); Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1237 days.

(21) Appl. No.: 11/431,822

(22) Filed: May 11, 2006

(65) Prior Publication Data
US 2007/0040927 A1 Feb. 22, 2007

(30) Foreign Application Priority Data

May 16, 2005 (JP) ................. 2005-142253

(51) Int. Cl.
*H04N 5/232* (2006.01)
*H04N 9/73* (2006.01)
*G03B 13/00* (2006.01)

(52) U.S. Cl.
USPC ....................... 348/348; 348/223.1

(58) Field of Classification Search .......... 348/348, 348/511, 607, 226.1, 223.1, 225.1, 254, 255, 348/370, 371
See application file for complete search history.

(56) References Cited

U.S. PATENT DOCUMENTS

| | | | |
|---|---|---|---|
| 4,641,959 A * | 2/1987 | Terashita | 355/77 |
| 5,239,369 A | 8/1993 | Suzuki | |
| 6,657,659 B1 | 12/2003 | Van Rooy et al. | |
| 6,678,407 B1 * | 1/2004 | Tajima | 382/167 |
| 2001/0033334 A1 | 10/2001 | Bakker et al. | |
| 2003/0142239 A1 * | 7/2003 | Yoshida et al. | 348/607 |
| 2006/0055823 A1 * | 3/2006 | Kinoshita et al. | 348/511 |

FOREIGN PATENT DOCUMENTS

| | | |
|---|---|---|
| EP | 1 324 598 A2 | 7/2003 |
| JP | 9-331537 | 12/1997 |
| JP | 11-122513 | 4/1999 |
| JP | 11-252446 | 9/1999 |
| JP | 2001-119708 | 4/2001 |
| JP | 2001-160976 | 12/2001 |
| JP | 2004-7402 | 1/2004 |
| JP | 2004-165932 | 6/2004 |
| JP | 2004-222228 | 8/2004 |
| JP | 2005-33616 | 2/2005 |
| WO | WO 99/56455 | 11/1999 |
| WO | WO 01/76234 A1 | 10/2001 |
| WO | WO 2004/047427 A1 | 6/2004 |

* cited by examiner

*Primary Examiner* — Roberto Velez
*Assistant Examiner* — Joel Fosselman
(74) *Attorney, Agent, or Firm* — Finnegan, Henderson, Farabow, Garrett & Dunner, L.L.P (57) ABSTRACT

Provided is an image process apparatus for processing a color image signal, including: an integration unit integrating at least one of each of color signals of the color image signal or a brightness signal obtained from the color image signal over at least one horizontal period; a normalization unit normalizing an integration value obtained by the integration unit and a difference between the integration values of adjacent fields or frames obtained by the integration unit; a frequency analysis unit extracting spectrum of output values of the normalization unit; a flicker component estimating unit estimating a flicker component from the spectrum extracted by the frequency analysis unit; an index generating unit calculating an index representing a degree that a photographing light source is estimated to a fluorescent lamp, based on an estimated result of the flicker component estimating unit; and a color balance control unit calculating a color balance control value of the color image signal according to the index from the index generating unit.

8 Claims, 6 Drawing Sheets

IMAGE PROCESS APPARATUS AND METHOD FOR PROCESSING A COLOR IMAGE SIGNAL

CROSS REFERENCES TO RELATED APPLICATIONS

The present invention contains subject matter related to Japanese Patent Application JP 2005-142253 filed in the Japanese Patent Office on May 16, 2005, the entire contents of which being incorporated herein by reference.

BACKGROUND OF THE INVENTION

1. Field of the Invention

The present invention relates to an image process apparatus for processing a color image signal and an image pickup apparatus having an image process function, and more particularly, to an image process apparatus and an image pickup apparatus adapted for processing a color image signal picked up by an XY address scanning type solid-state image pickup device.

2. Description of Related Art

Recently, image pickup apparatuses for picking up and storing an image using a solid-state image pickup device such as a digital still camera or a digital video camera come into wide use. As an image pickup device used for the image pickup apparatus, a charge coupled device (CCD) image sensor is most generally used. Recently, as the number of the pixels of the image pickup device has increased, a complementary metal oxide semiconductor (CMOS) image sensor is attracting much attention. The CMOS image sensor has a function of randomly accessing an image signal and has higher read-out speed, higher sensitivity, lower power consumption, compared with the CCD image sensor.

In addition, most of the image pickup apparatus has an automatic white balance function for automatically determining a white balance control value depending on a photographing light source. The photographing light source is generally estimated based on a pickup signal. As a general estimating method, there is a method of estimating the photographing light source from a sampling average of a high brightness portion or a middle brightness portion based on assumption called gray world in which a spectral reflection factor of a subject included in a photographed scene is averagely close to a flat. However, since this assumption may not be established in any subject, an adequate control result may not be obtained.

For example, when an RGB-color image pickup device having spectral sensitivity having a relatively high green response under a fluorescent lamp is used, a ratio of a gain of G to R and B under the fluorescent lamp is preferably lower than that of natural light. However, when the light source is not the fluorescent lamp but the color of the subject has a large amount of green component, the light reflected from the subject has a large amount of green component. Accordingly, it is difficult to estimate whether the light source is the fluorescent lamp or not and to obtain adequate white balance. At this time, when it is previously determined whether the light source is the fluorescent lamp or not, it is possible to improve the white balance control result in consideration of the characteristics of the image pickup device. Accordingly, there is a need for automatically and accurately determining whether the light source is the fluorescent lamp or not.

In addition, another method of estimating a photographing light source, there is disclosed a method of previously setting a plurality of light sources, comparing and detecting validities of the respective light sources at the time of control to perform estimation, and selecting and interpolating a control parameter suitable for the photographing light source from a preset value (for example, see Patent Document 1). In such a method, when the fluorescent lamp is not included in the set light sources, adequate white balance is not obtained under the fluorescent lamp, and, although the fluorescent lamp is included in the set light sources, it may be wrongly determined that the light source is the fluorescent lamp at the time of comparing and detecting.

In addition, in the image pickup apparatus, the pick-up color signal may be subjected to a correction process such as matrix conversion such that adequate color reproduction is observed in a display apparatus. A correction value of a matrix coefficient in this process varies by the photographing light source. In particular, in a light source having a color rendering property different from that of natural light, such as the fluorescent lamp, precision of color reproduction may not be sufficiently obtained in the same parameter as that of the natural light. Accordingly, even in the control of the color reproduction parameter, it is important to accurately determine the fluorescent lamp.

In the related art of determining whether the light source is the fluorescent lamp using the pickup signal, an external sensor is formed or a color filter having a band pass property is formed in an image pickup device or an optical system in order to determine whether the light source is the fluorescent lamp based on the spectral distribution characteristics. Accordingly, the manufacturing cost or the size of the apparatus increases. Meanwhile, a technology of determining whether a photographing light source is a fluorescent lamp based on a flicker detecting result using a method of reducing flicker of a pickup image generated by blinking of the fluorescent lamp is being considered.

Patent Document 1: Japanese Unexamined Patent Application Publication No. 2004-165932 (paragraphs [0034] to [0073] and FIG. 4)

SUMMARY OF THE INVENTION

However, most of the flicker detecting technology in the related art is performed on the assumption that exposure timings of whole surface of an image pickup device such as CCD are unified and thus does not apply to an XY address scanning type image pickup device such as a CMOS image pickup deice.

It is desirable to provide an image process apparatus capable of adequately controlling a color signal of an image picked up by an XY address scanning type solid-state image pickup device to obtain a high-quality image.

In addition, it is desirable to provide an image pickup apparatus capable of adequately controlling a color signal of an image picked up by an XY address scanning type solid-state image pickup device to obtain a high-quality image.

According to an embodiment of the present invention, there is provided an image process apparatus for processing a color image signal, including: an integration unit which integrates at least one of each of color signals of the color image signal or a brightness signal obtained from the color image signal over at least one horizontal period; a normalization unit which normalizes an integration value obtained by the integration unit and a difference between the integration values of adjacent fields or frames obtained by the integration unit; a frequency analysis unit which extracts spectrum of output values of the normalization unit; a flicker component estimating unit which estimates a flicker component from the spectrum extracted by the frequency analysis unit; an index generating unit which calculates an index representing a degree that a photographing light source is estimated to a fluorescent lamp, based on an estimated result of the flicker component estimating unit; and a color balance control unit which calculates a color balance control value of the color image signal according to the index from the index generating unit.

In the image process apparatus, the integration unit integrates at least one of each of the color signals of the color image signal or the brightness signal obtained from the color image signal over at least one horizontal period, the normalization unit normalizes the integration value and the difference between the integration values of adjacent fields or frames obtained by the integration unit, the frequency analysis unit extracts spectrum of output values of the normalization unit, and the flicker component estimating unit estimates the flicker component from the spectrum extracted by the frequency analysis unit. Accordingly, the flicker component generated in an image signal picked up by an XY address scanning type solid-state image pickup device under a fluorescent lamp is estimated.

In addition, the index generating unit calculates the index representing a degree that a photographing light source is estimated to a fluorescent lamp, based on an estimated result of the flicker component estimating unit, and the color balance control unit calculates the color balance control value of the color image signal according to the index from the index generating unit. Accordingly, it is estimated whether the photographing light source is the fluorescent lamp or not, based on the result of estimating the flicker component, and the color balance control value is output according to the estimation.

According to the image process apparatus of the present invention, since a flicker component generated in an image signal picked up by an XY address scanning type solid-state image pickup device under a fluorescent lamp can be estimated and a photographing light source can be estimated based on the estimated to calculate a color balance control value, the color balance can be adequately controlled according to the photographing light source and a high-quality image can be obtained.

DESCRPITION OF PREFERRED EMBODIMENTS

Hereinafter, an embodiment of the present invention will be described in detail with reference to the attached drawings.
<System Configuration>

Figure 1:
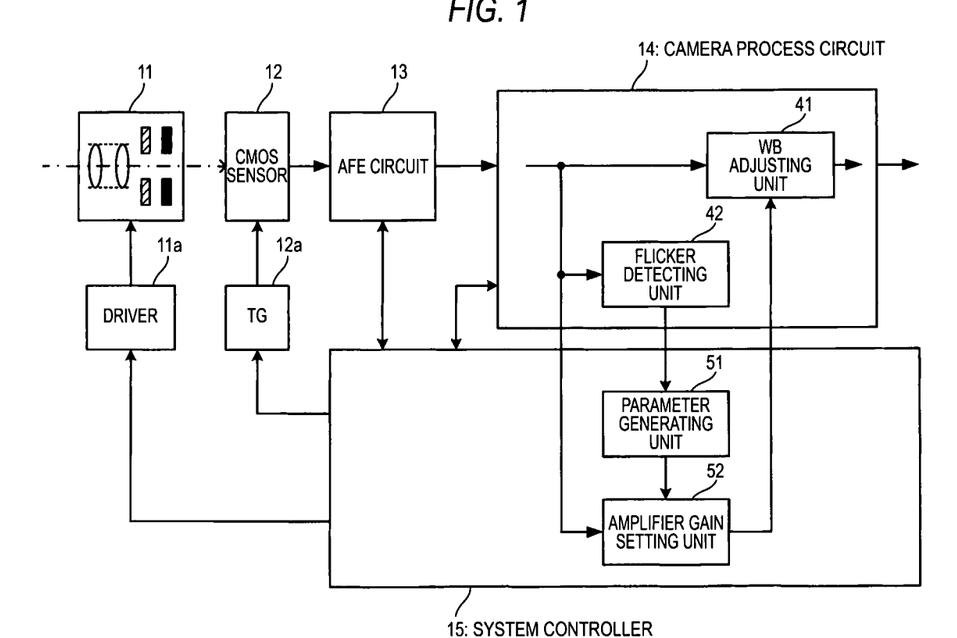
FIG. 1 is a block diagram showing main parts of an image pickup apparatus according to an embodiment of the present invention.

FIG. 1 is a block diagram showing main parts of an image pickup apparatus according to an embodiment of the present invention.

The image pickup apparatus shown in FIG. 1 includes an optical block 11, a driver 11a, a CMOS image sensor (hereinafter, referred to as CMOS sensor) 12, a timing generator (TG) 12a, an analog front end (AFE) circuit 13, a camera process circuit 14, and a system controller 15.

The optical block 11 includes a lens for focusing light from a subject to the CMOS sensor 12, a driving mechanism for moving the lens to perform focusing or zooming, a shutter mechanism, and an iris mechanism. The driver 11a controls driving of the mechanisms in the optical block 11 based on a control signal from the system controller 15.

In the CMOS sensor 12, a plurality of pixels including a photodiode (photo-gate), a transport gate (shutter transistor), a switching transistor (address transistor), an amplifying transistor, and a reset transistor (reset gate) is arranged in two dimensions and a vertical scanning circuit, a horizontal scanning circuit, and an image signal output circuit are formed, on a CMOS substrate. The CMOS sensor 12 is driven based on a timing signal output from the TG 12a and converts light input from the subject into an electrical signal. The TG 12a outputs a timing signal under the control of the system controller 15.

In the present embodiment, an analog image signal obtained from the CMOS sensor 12 is an RGB primary color signal, but may be a complementary color signal. The AEF circuit 13 is, for example, configured by one integrated circuit (IC). The AEF circuit 13 samples and holds the image signal output from the CMOS sensor 12 by a correlated double sampling process to maintain a signal/noise (S/N) ratio, controls a gain by an auto gain control (AGC) process, performs an A/D conversion, and outputs a digital image signal. The circuit for performing the CDS process may be formed on the same substrate as the CMOS sensor 12.

The camera process circuit 14 is, for example, configured by one IC. The camera process circuit 14 performs camera signal processes such as a color correction such as the below-described white balance adjustment, auto-focus (AF), and auto-exposure (AE) on the image signal from the AFE circuit 13 or a portion of the processes.

The system controller 15 is, for example, a microcontroller including a central processing unit (CPU), a read only memory (ROM), and a random access memory (RAM). The system controller 15 executes a program stored in the ROM to control the respective units of the image pickup apparatus. In addition, as described below, the system controller 15 communicates with the camera process circuit 14 and performs a portion of a calculation for the camera signal process.

In the image pickup apparatus, a signal obtained by receiving the light and converting the light into an electric signal by the CMOS sensor 12 is sequentially supplied to the AFE circuit 13, subjected to the CDS process or the AGC process, and converted into a digital signal. The camera process circuit 14 performs an image quality correction process on the digital image signal supplied from the AFE circuit 13, converts the digital image signal into a brightness signal Y and color difference signals R-Y and B-Y, and outputs the converted signals.

Image data output from the camera process circuit 14 is supplied to a graphic interface (I/F) (not shown) to be converted into an image signal to be displayed on a monitor, thereby displaying a camera-through image on the monitor. In addition, when the system controller 15 is instructed to record the image by an input operation of a user, the image data from the camera process circuit 14 is supplied to an encoder (not shown) and subjected to a predetermined compression coding process to be recorded in a recording medium (not shown). At the time of recording a still image, image data of one frame is supplied from the camera process circuit 14 to the encoder, and, at the time of recording a moving picture, the processed image data is continuously supplied to the encoder.

Next, a function for realizing a white balance adjusting process in the image pickup apparatus will be described. For such a function, as shown in FIG. 1, a white balance (WB) adjusting unit 41 and a flicker detecting unit 42 are formed in the camera process circuit 14 and a parameter generating unit 51 and an amplifier gain setting unit 52 are formed in the system controller 15.

The WB adjusting unit 41 is a gain control amplifier for adjusting the white balance, which individually changes the respective signal levels of colors R, G, and B of the pickup image signal, and the gain thereof is set by a control signal from the amplifier gain setting unit 52. The flicker detecting unit 42 detects a flicker component generated on a screen due to periodic brightness variation (light amount variation) of a fluorescent lamp when a photographing light source is the fluorescent lamp, based on a, detection value of the pickup image signal and outputs a value representing the detection result to the parameter generating unit 51.

The parameter generating unit 51 generates a parameter representing whether the photographing light source is the fluorescent lamp or not, based on the flicker detecting result and outputs the parameter to the amplifier gain setting unit 52. The amplifier gain setting unit 52 sets an amplifier gain control value to the WB adjusting unit 41 such that the white balance becomes adequate based on the detection value of the pickup image signal. The amplifier gain setting unit 52 calculates a control value in which a signal of a white (achromatic) subject in the image becomes R=G=B according to a result of determining the photographing light source, based on the detection result of the pickup image signal and the parameter from the parameter generating unit 51, and sets the control value to the WB adjusting unit 41.

By using the flicker detecting result of the fluorescent lamp for estimating the photographing light source, it is accurately estimated whether the photographing light source is the fluorescent lamp or not and the white balance adjustment precision is improved. In addition, by using the below-described flicker detecting sequence, flicker detection precision can increase and thus the white balance adjustment precision can increase.

<Flicker Detecting Method>

Figure 2:
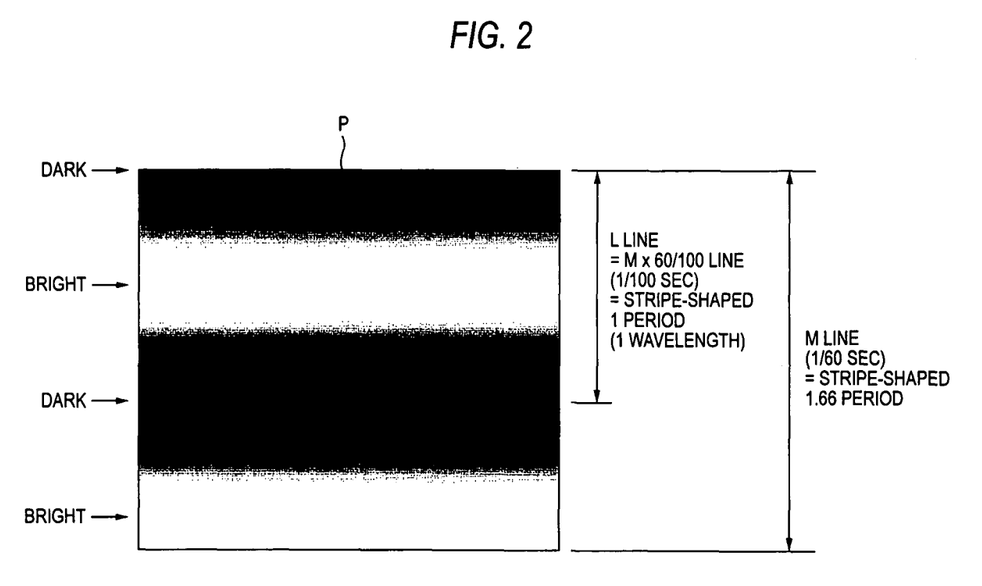
FIG. 2 is a view of explaining flicker.

FIG. 2 is a view of explaining flicker.

The flicker is generated at the time of photographing under a blinking light source such as a fluorescent lamp, and a periodic vertical brightness level or color variation is observed when an image is picked up by an XY address scanning image pickup device such as a CMOS sensor, as shown by an image P of FIG. 2. The image P represents a state that the flicker is displayed in light and dark stripes when the subject is uniform.

For example, in the fluorescent lamp using a commercial AC power supply having a frequency of 50 Hz, a blinking frequency is 100 Hz. In a national television standards committee (NTSC) video signal using a field frequency of 60 Hz, when the number of lines per one field is M, a stripe-shaped period L due to such variation becomes (M×60/100) line. In addition, in one field, the periodic variation is generated in 100/60=1.66 period. That is, the periodic variation is repeated every three fields.

Figure 3:
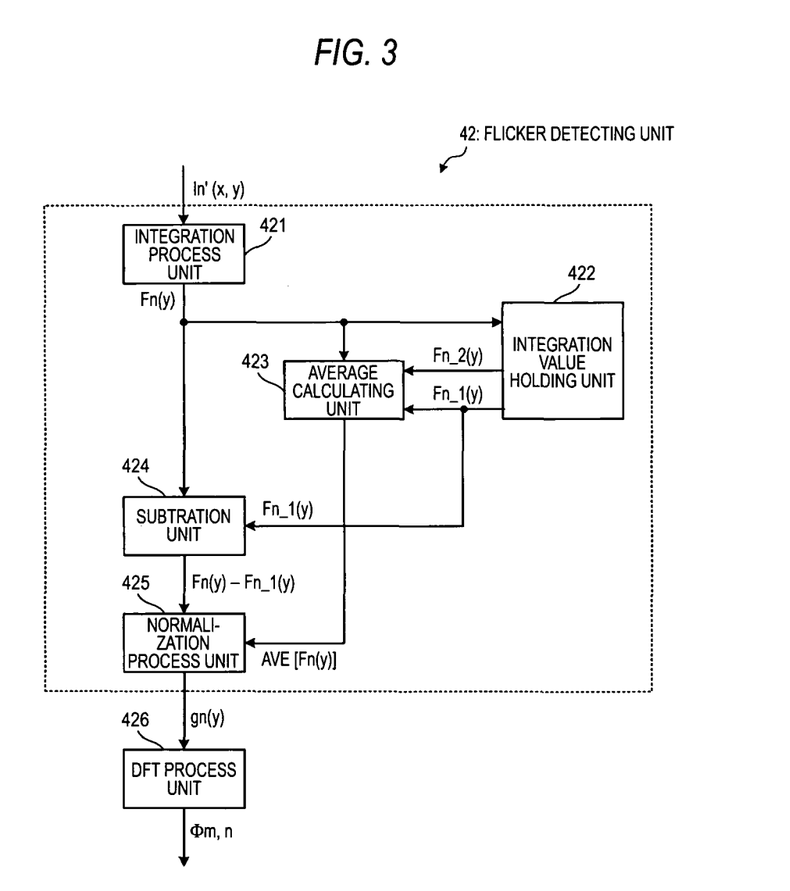
FIG. 3 is a block diagram showing an internal configuration of a flicker detecting unit.

FIG. 3 is a block diagram showing an internal configuration of a flicker detecting unit 42.

As shown in FIG. 3, the flicker detecting unit 42 includes an integration process unit 421, an integration value holding unit 422, an average calculating unit 423, a subtraction unit 424, a normalization process unit 425, and a discrete Fourier transform (DFT) process unit 426.

In the image pickup apparatus according to the present embodiment, the brightness signal and the color difference signal configuring the image signal are subjected to a process using the blocks shown in FIG. 3. Alternatively, at least the brightness signal is subjected to this process, and, if necessary, the color difference signals and the color signals may be subjected to this process. Alternatively, in the brightness signal, the color signals before synthesis into the brightness signal may be subjected to this process. In addition, in the color signals, the primary color signals or complementary color signals may be subjected to this process. When the color signals are subjected to this process, each of the color signals is subjected to the process using the blocks shown in FIG. 3.

Hereinafter, a method of detecting the flicker will be described with reference to FIG. 3.

In general, a flicker component is proportional to a signal intensity of a subject. Accordingly, when an input image signal (brightness signal or RGB primary signal before reducing the flicker) in any pixel (x, y) and any field n of a general subject is In'(x, y), In'(x, y) is expressed by Equation 1 as a sum of a signal component including no the flicker component and a flicker component proportional thereto.

$$In'(x,y) = [1 + \Gamma n(y)] \times In(x,y) \quad \text{Equation 1}$$

Where, In(x, y) denotes a signal component, $\Gamma n(y) \times In(x, y)$ denotes the flicker component, and $\Gamma n(y)$ denotes a flicker coefficient. Since one horizontal period is sufficiently shorter than the light emitting period (1/100 sec) of the fluorescent lamp and the flicker coefficient is uniform in the same line of the same field, the flicker coefficient is denoted by $\Gamma n(y)$.

In order to generalize $\Gamma n(y)$, as expressed by Equation 2, $\Gamma n(y)$ is expanded in Fourier series. Accordingly, it is possible to express the flicker coefficient including a light emission characteristic and a decay characteristic, both of which vary depending on the kind of the fluorescent lamp.

$$\Gamma n(y) = \sum_{m=1}^{\infty} \gamma m \times \cos\left[m \times \frac{2\pi}{\lambda 0} \times y + \Phi m, n\right] \quad \text{Equation 2}$$

$$= \sum_{m=1}^{\infty} \gamma m \times \cos(m \times \omega 0 \times y + \Phi m, n)$$

In Equation 2, λ0 denotes a wavelength of the flicker in a pixel shown in FIG. 2 and corresponds to a line L (=M×60/100) when the number of read-out lines per one field is M. ω0 denotes an angular frequency normalized by λ0.

In addition, γm denotes an amplitude of the flicker component of each order (m=1, 2, 3, . . . ). Φm,n denotes an initial phase of the flicker component of each order and is determined by a light emitting period (1/100 sec) and an exposure timing of the fluorescent lamp. Since Φm,n has the same value every three fields, a difference in Φm,n between a just previous field and the present field are expressed by Equation 3.

$$\Delta \Phi m, n = -\frac{2\pi}{3} \times m \quad \text{Equation 3}$$

<Calculation and Storage of Integration Value>

In the flicker detecting unit 42 shown in FIG. 3, in order to detect the flicker and reduce influence of a picture, the integration process unit 421 integrates the input image signal In'(x, y) over one line in a screen horizontal direction, as expressed by Equation 4 to calculate an integration value Fn(y). As expressed by Equation 5, $\alpha_n(y)$ in Equation 4 is an integration value over one line of the signal component In(x, y).

$$\Gamma n(y) = \sum_x In'(x, y) \qquad \text{Equation 4}$$
$$= \sum_x ([1 + \Gamma n(y)] \times In(x, y))$$
$$= \sum_x In'(x, y) + \Gamma n(y) \sum_x In(x, y)$$
$$= \alpha_n(y) + \alpha_n(y) \times \Gamma n(y)$$

$$\alpha_n(y) = \sum_x In(x, y) \qquad \text{Equation 5}$$

The calculated integration value Fn(y) is used for detecting the flicker in subsequent fields and temporarily stored in the integration value holding unit 422. The integration value holding unit 422 can hold integration values of at least two fields.

<Calculation of Average and Calculation of Difference>

Accordingly, in the flicker detecting unit 42 of FIG. 3, integration values of successive three fields are used for removing influence of $\alpha_n(y)$ from the integration value Fn(y). That is, in this example, at the time of calculating the integration value Fn(y), an integration value Fn_1(y) of the same line of one field before and an integration value Fn_2(y) of the same line of two fields before are read out from the integration value holding unit 422 and the average AVE[Fn(y)] of three integration values Fn(y), Fn_1(y), and Fn_2(y) is calculated by the average calculating unit 423.

When it is assumed that the subject is substantially the same in the period of three successive fields, $\alpha_n(y)$ may be considered to the same value. When the movement of the subject is sufficiently small in the three fields, this assumption is no problematic in practice. In addition, calculation of the average of the integration values in the three successive fields is similar to addition of signals in which the phases of the flicker components are deviated from one another by $(-2n/3) \times m$ and thus the flicker component negates. Accordingly, the average vale AVE[Fn(y)] is expressed by Equation 6.

$$AVE[Fn(y)] = \frac{1}{3} \sum_{k=0}^{2} Fn\_k(y) \qquad \text{Equatioin 6}$$
$$= \frac{1}{3} \left\{ \sum_{k=0}^{2} \alpha_{n-k}(y) + \alpha_{n\_k}(y) \times \Gamma n\_k(y) \right\}$$
$$= \frac{1}{3} \sum_{k=0}^{2} \alpha_{n\_k}(y) + \frac{1}{3} \sum_{k=0}^{2} \alpha_{n\_k}(y) \times \Gamma n\_k(y)$$
$$= \alpha_n(y) + \frac{1}{3} \alpha_n(y) \sum_{k=0}^{2} \Gamma n\_k(y)$$
$$= \alpha_n(y)$$

$$\alpha_n(y) \approx \alpha_{n\_1}(y) \approx \alpha_{n\_2}(y) \qquad \text{Equation 7}$$

The above description relates to a case of calculating the average of the integration values in the three successive fields on the assumption that the approximation of Equation 7 is established, but, when the movement of the subject is large, the approximation of Equation 7 is not established. The flicker detecting unit 42 of FIG. 3 is operated when the approximation of Equation 7 is established. In this example, in the subtraction unit 424, a difference between the integration value Fn(y) of the present field from the integration process unit 421 and the integration value Fn_1(y) of the previous field from the integration value holding unit 422 is calculated. Equation 8 is also established on the assumption that the approximation of Equation 7 is established.

$$Fn(y) - Fn\_1(y) = \{\alpha_n(y) + \alpha_n(y) \times \Gamma n(y)\} - \qquad \text{Equation 8}$$
$$\{\alpha_{n-1}(y) + \alpha_{n-1}(y) \times \Gamma n - 1(y)\}$$
$$= \alpha_n(y) \times \{\Gamma n(y) - \Gamma n\_1(y)\}$$
$$= \alpha_n(y) \sum_{m=1}^{\infty} \gamma m \times$$
$$\{\cos(m \times \omega 0 \times y + \Phi m, n) -$$
$$\cos(m \times \omega 0 \times y + \Phi m, n\_1)\}$$

<Normalization of Difference>

In the flicker detecting unit 42 of FIG. 3, the normalization process unit 425 divides the difference Fn(y)–Fn_1(y) from the subtraction unit 424 by the average AVE[Fn(y)] from the average calculating unit 423 to perform normalization and calculates a difference gn(y) after normalization.

The difference gn(y) after normalization is expanded by Equation 9 using Equations 6 and 8 and a sum-product equation of a trigonometric function, and Equation 10 is obtained from the relationship of Equation 3. In Equation 10, |Am| and θm are expressed by Equations 11 and 12, respectively.

$$gn(y) = \frac{Fn(y) - Fn\_1(y)}{AVE[Fn(y)]} \qquad \text{Equation 9}$$
$$= \sum_{m=1}^{\infty} \gamma m \times \{\cos(m \times \omega 0 \times y + \Phi m, n) -$$
$$\cos(m \times \omega 0 \times y + \Phi m, n\_1)\}$$
$$= \sum_{m=1}^{\infty} (-2)\gamma m \times$$
$$\left\{ \sin\left(m \times \omega 0 \times y + \frac{\Phi m, n + \Phi m, n\_1}{2}\right) \times \right.$$
$$\left. \sin\left(\frac{\Phi m, n - \Phi m, n\_1}{2}\right) \right\}$$

$$gn(y) = \sum_{m=1}^{\infty} (-2)\gamma m \times \sin \qquad \text{Equation 10}$$
$$\left(m \times \omega 0 \times y + \Phi m, n + m \times \frac{\pi}{3}\right) \times \sin\left(-m \times \frac{\pi}{3}\right)$$
$$= \sum_{m=1}^{\infty} 2 \times \gamma m \times \cos$$
$$\left(m \times \omega 0 \times y + \Phi m, n + m \times \frac{\pi}{3} - \frac{\pi}{2}\right) \times$$
$$\sin\left(m \times \frac{\pi}{3}\right)$$
$$= \sum_{m=1}^{\infty} 2 \times \gamma m \times \sin\left(m \times \frac{\pi}{3}\right) \times \cos$$
$$\left(m \times \omega 0 \times y + \Phi m, n + m \times \frac{\pi}{3} - \frac{\pi}{3}\right)$$
$$\sum_{m=1}^{\infty} |Am| \times \cos(m \times \omega 0 \times y + \theta m)$$

$$|Am| = 2 \times \gamma m \times \sin\left(m \times \frac{\pi}{3}\right) \qquad \text{Equation 11}$$

$$\theta m = \Phi m, n + m \times \frac{\pi}{3} - \frac{\pi}{3} \qquad \text{Equation 12}$$

<Estimation of Flicker Component due to Spectral Extraction>

θm expressed by Equation 12 is an initial phase of spectrum of each order of the difference gn(y) after normalization. When the difference gn(y) after normalization is subjected to Fourier transform to detect the initial phase θm of the spectrum of each order, the initial phase Φm,n of the flicker component of each order expressed by Equation 2 can be obtained by Equation 13.

$$\Phi m, n = \Phi m - m \times \frac{\pi}{3} + \frac{\pi}{2} \qquad \text{Equation 13}$$

Accordingly, in the flicker detecting unit 42 of FIG. 3, the DFT process unit 426 performs discrete Fourier-transform on data of one wavelength (L line) of the flicker of the difference gn(y) after normalization from the normalization process unit 425.

When the DFT calculation is DFT[gn(y)] and DFT result of order m is Gn(m), the DFT calculation is expressed by Equation 14. Where, W in Equation 14 is expressed by Equation 15.

$$DFT[gn(y)] = Gn(m) = \sum_{i=0}^{L-1} gn(i) \times W^{m \times i} \qquad \text{Equation 14}$$

$$W = \exp\left[-j \times \frac{2\pi}{L}\right] \qquad \text{Equation 15}$$

In addition, from the definition of DFT, the relationship between Equation 12 and Equation 14 is expressed by Equation 16.

$$\theta m = \tan^{-1}\left(\frac{\text{Im}(Gn(m))}{\text{Re}(Gn(m))}\right) \qquad \text{Equation 16}$$

Where, Im(Gn(m)): imaginary part
Re(Gn(m)): real part

Accordingly, form Equations 13 and 16, the initial phase Φm,n of the flicker component of each order can be obtained by Equation 17.

$$\Phi m, n = \tan^{-1}\left(\frac{\text{Im}(Gn(m))}{\text{Re}(Gn(m))}\right) - m \times \frac{\pi}{3} + \frac{\pi}{2} \qquad \text{Equation 17}$$

The DFT process unit 426 extracts spectrum by the DFT calculation defined by Equation 14 and then estimates the initial phase Φm,n of the flicker component of each order by the calculation of Equation 17. The calculated initial phase Φm,n is output to the parameter generating unit 51 of the system controller 15.

According to the above-described flicker detecting method, even in an area such as a black background portion and a low-light intensity portion in which the flicker component is very small and thus completely embedded in the signal component in the integration value Fn(y), the flicker component can be precisely detected by calculating and normalizing the difference Fn(y)−Fn_1(y) to the average AVE[Fn(y)].

In addition, under an actual fluorescent lamp, since the flicker component cam be sufficiently approximated although the order is restricted to several orders, a total orders is not infinity and can be restricted to a predetermined order, for example, two orders in calculation of the flicker coefficient Γn(y) due to Equation 2.

When the flicker component is estimated from the spectrum up to a proper order, the difference gn(y) after normalization is approximated, without being completely reproduced, and thus, although a discontinuous portion is generated in the difference gn(y) after normalization by the state of the subject, the flicker component at the discontinuous portion can be precisely estimated.

When the difference Fn(y)−Fn_1(y) is normalized by the average AVE[Fn(y)], finite coefficient precision can be efficiently ensured. For example, when the desired calculation precision can be satisfied, the integration value Fn(y) may be directly normalized by the average AVE[Fn(y)]. Instead of the average AVE[Fn(y)], normalization is performed by the integration Fn(y).

Although, in the above-described example, the input image signal In'(x, y) is integrated over one line, the integration may be performed over at least one line, because this integration is to reduce the influence of the picture to obtain the sampling value of the flicker component. At this time, the number of the pixels to be sampled in the integration period may decrease. Actually, several or at least ten sampling values are preferably obtained in one period of the flicker in the screen, that is, L lines.

<Generation of Index of Fluorescent Lamp>

Figure 4:
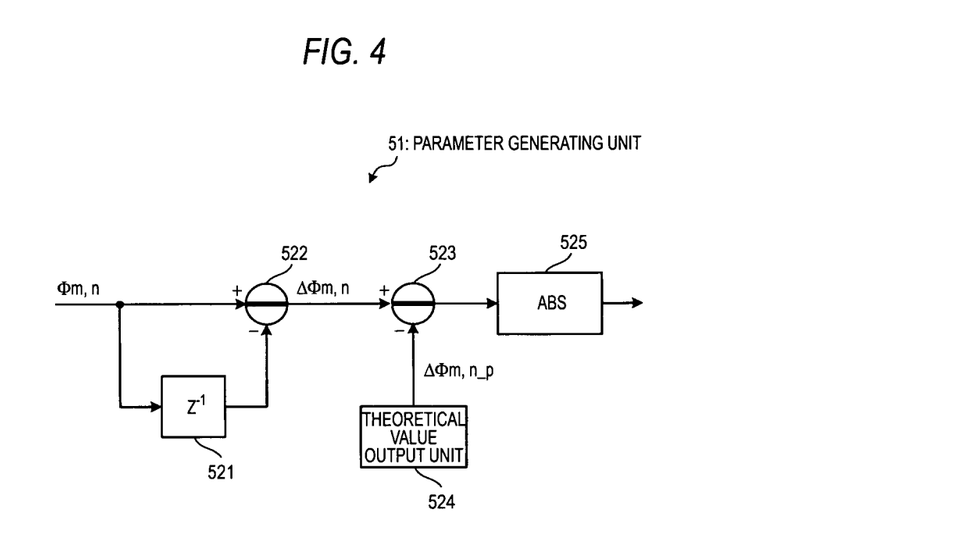
FIG. 4 is a view showing an internal configuration of a parameter generating unit.

FIG. 4 is a view showing an internal configuration of a parameter generating unit 51.

The parameter generating unit 51 includes a delay 521, subtractors 522 and 523, a theoretical value output unit 524, and an absolute value output unit (ABS) 525. The parameter generating unit 51 receives the initial phase Φm,n of the flicker component of each order obtained by the DFT process unit 426 of the flicker detecting unit 42. The delay 521 holds the initial phase of one sampling before in an adjacent field (or frame) and the subtractor 522 calculates the difference ΔΦm,n between the initial phase in the delay 521 and the present initial phase.

The theoretical value output unit 524 outputs a theoretical value ΔΦm,n, n_p of the difference ΔΦm,n generated under the fluorescent lamp and the subtractor 523 calculates a difference between the difference ΔΦm,n output from the subtractor 522 and the theoretical value ΔΦm,n, n_p. ΔΦm,n, n_p is calculated by Equation 3.

The ABS 525 obtains an absolute value of the output value of the subractor 523 and outputs the absolute value to the amplifier gain setting unit 52 as an index (hereinafter, referred to as fluorescent lamp estimation index) representing the probability that the light source is the fluorescent lamp (degree that the light source can be estimated to the fluorescent lamp). The lower the fluorescent lamp estimation index, the higher the probability that the light source is the fluorescent lamp, because the difference between the calculated ΔΦm,n and the theoretical value ΔΦm,n, n_p under the fluorescent lamp is small.

For example, a temporal low pass filter may be formed on the next stage of the subtractor 522 or 523 or the next stage of the ABS 525. Accordingly, it is possible to remove a noise component from the output value to increase flicker detection precision.

<Determination of Fluorescent Lamp and Determination of WB Gain>

The amplifier gain setting unit 52 sets a fluorescent lamp determining flag according to the fluorescent lamp estimation index from the parameter generating unit 51. The fluorescent lamp estimation index is compared with a predetermined threshold value, and, when the fluorescent lamp estimation index is grater than the threshold value, the fluorescent lamp determining flag is set to "0", and, otherwise, the fluorescent lamp determining flag is set to "1".

In order to suppress influence of error in flicker detection, for example, when the fluorescent lamp estimation indexes from the parameter generating unit 51 are continuously equal to or less than the threshold value by a predetermined number of the fields (or the frames), the fluorescent lamp determining flag may be set to "1".

Meanwhile, the camera process circuit 14 detects a result of integrating the input signals R, G, and B in an efficient pixel area every field (or frame). In the detection, a sampling condition can be set according to the position of the pixel or the signal level. The amplifier gain setting unit 52 receives detection signals Rd, Gd, and Bd and determines WB gains Rgn and Bgn by the process shown in FIG. 5 every field (or frame).

Figure 5:
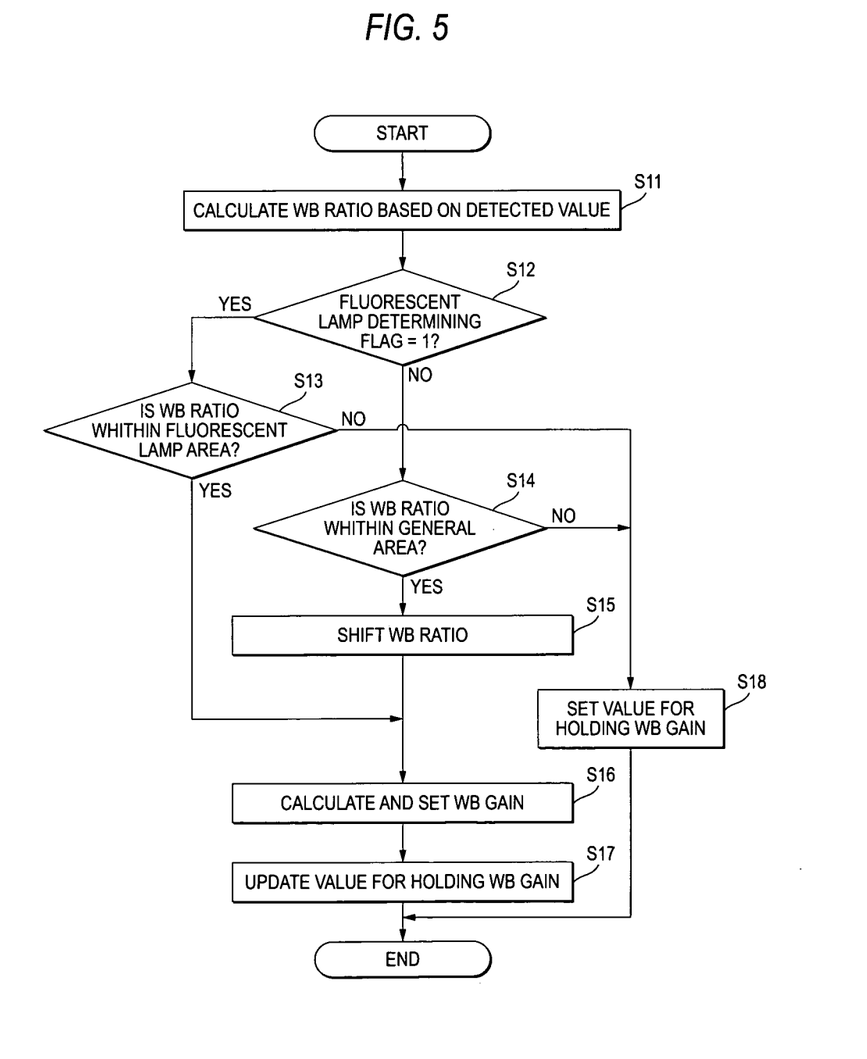
FIG. 5 is a flowchart showing a method of determining a WB gain.

FIG. 5 is a flowchart showing a method of determining a WB gain.

The amplifier gain setting unit 52 calculates WB ratios Rrt and Brt based on the detection signals Rd, Gd, and Bd, as described above (step S11). The WB ratios are calculated by Rrt=Rd/Gd and Brt=Bd/Gd.

Next, the process is performed depending on the value of the fluorescent lamp determining flag (step S12). As to whether the light source is the fluorescent lamp or not, a range that the probability that the WB ratios Rrt and Brt appear is high are previously set and it is determined whether the calculated WB ratios Rrt and Brt is in the range. That is, when the fluorescent lamp determining flag is "1", it is determined whether the calculated WB ratios Rrt and Brt are in a WB ratio area (fluorescent lamp area) set to the fluorescent lamp (step S13). In addition, when the fluorescent lamp determining flag is "0", it is determined whether the calculated WB ratios Rrt and Brt are in a WB ratio area (general area) set to a general light source (for example, sunlight) different from the fluorescent lamp (step S14).

In the determination of S13, when the WB ratios Rrt and Brt are in the fluorescent lamp area, WB gains Rgn and Bgn are calculated using the WB ratios Rrt and Brt and set to the WB adjusting unit 41 (step S16). The WB gains are calculated by Rgn=1/Rrt and Bgn=1/Brt. In addition, the amplifier gain setting unit 52 holds the calculated WB gains Rgn and Bgn and updates the held value by the WB gains Rgn and Bgn calculated in the step S16 (step S17).

In addition, in the determination of the step S14, when the WB ratios Rrt and Brt are in the general area, the WB ratios Rrt and Brt are shifted to a closest point of a reference locus such as a blackbody locus on a chromaticity coordinate (step S15). Thereafter, the WB gains Rgn and Bgn are calculated and set using the shifted WB ratio (step S16) and the held value of the WB gains Rgn and Bgn are updated (step S17).

In the determinations of the steps S13 and S14, when the WB ratios Rrt and Brt are out of the area, the detection result of the present field (or frame) is invalid, the held value of the WB gains Rgn and Bgn are not updated, and the held value is set to the WB adjusting unit 41 (step S18).

By the above-described process, the WB gains Rgn and Bgn are set to the WB adjusting unit 41. In addition, the WB adjusting unit 41 multiplies the gain control value by the input signals R and B and outputs the multiplied value together with the input signal G. In this process, the light source is estimated based on the flicker detecting result and it is determined whether the WB ratios obtained by detecting the image signal are in a range of a value expected according to the estimated light source. Accordingly, the probability of wrongly detecting of the light source can be reduced and the detection precision can be improved.

Figure 6:
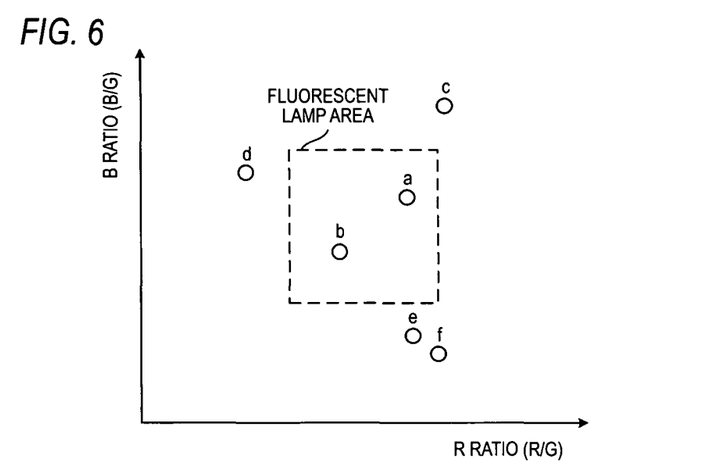
FIG. 6 shows an example of a fluorescent area.

FIG. 6 shows an example of a fluorescent area.

In FIG. 6, an example in which the fluorescent lamp area used in the step S13 of FIG. 5 is set on the chromaticity coordinate is shown. The fluorescent lamp area is an area in which the probability that the WB ratios Rrt and Brt appear is high when the light source is the fluorescent lamp. When the WB ratios Rrt and Brt are in the fluorescent lamp area as shown by points a and b of FIG. 6, it is determined that the calculated value is determined to be valid. In addition, when the WB ratios Rrt and Brt are out of the fluorescent lamp area as shown by points c to f, the calculated value is determined to be invalid. Even when the calculated WB ratios Rrt and Brt are out of the fluorescent lamp area, the WB ratios Rrt and Brt may be shifted to closest points on a boundary of the fluorescent lamp area such that the WB gains Rgn and Bgn are calculated from the shifted values, without determining that the WB ratios Rrt and Brt are invalid.

Figure 7:
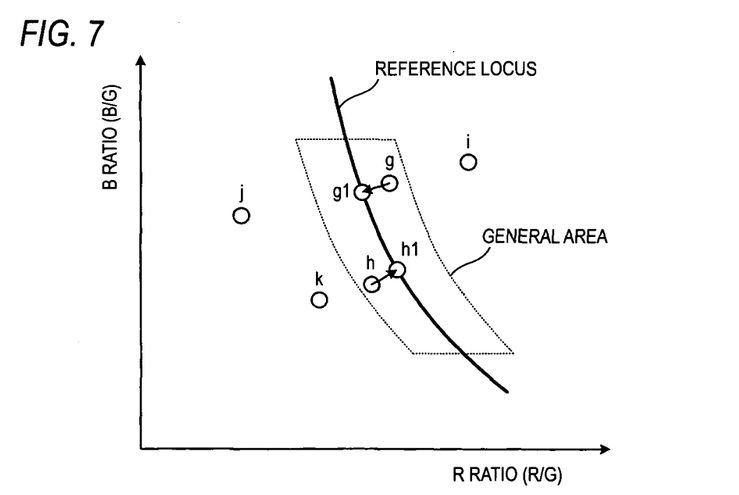
FIG. 7 shows an example of a general area.

FIG. 7 shows an example of a general area.

In FIG. 7, an example in which the general area used in the step S14 of FIG. 5 is set on the chromaticity coordinate is shown. The fluorescent lamp area is an area in which probability that the WB ratios Rrt and Brt appear is high when the light source is a lamp different from fluorescent lamp. When the WB ratios Rrt and Brt are in the general area as shown by points g and h of FIG. 7, the calculated is determined to be valid. In addition, in the present embodiment, the calculated WB ratios Rrt and Brt are shifted to closest points on the reference locus (for example, the black body locus) passing through the general area. Accordingly, the points g and h are shifted in a direction perpendicular to the reference locus as shown by points g1 and h1, respectively. Accordingly, by shifting the calculated WB ratios Rrt and Brt onto the closest reference locus, it is possible to obtain more natural color.

When the WB ratios Rrt and Brt are out of the general area as shown by points i to k, the calculated WB ratios Rrt and Brt are determined to be invalid. Similar to the fluorescent lamp area, even when the calculated WB ratios Rrt and Brt are out of the general area, the WB ratios Rrt and Brt may be shifted to closest points on a boundary of the general area such that the WB gains Rgn and Bgn are calculated from the shifted values, without determining that the WB ratios Rrt and Brt are invalid.

As shown in FIGS. 6 and 7, an area may not be formed using continuous value as the fluorescent lamp area or the general area. That is, a plurality of discrete control target points are previously stored according to the fluorescent lamp area or the general area such that points closest to the calculated WB ratios Rrt and Brt are selected from the control target points. In the determination as to whether the light source is the fluorescent lamp or not, a multi-step parameter representing the probability that the light source is the fluorescent lamp may be generated, not the flag "0" or "1" based on the fluorescent estimation index from the parameter generating unit 51. In addition, a coefficient weighted depending on the parameter is interpolated between a control target point for the fluorescent lamp and the other control target point among the control target points to determine a final control target point, such that a suitable WB gain control value can be obtained even when the different light source are mixed.

As described above, in the image pickup apparatus according to the present embodiment, when the XY address scanning type image pickup device such as the CMOS image sensor is used, it is estimated whether the photographing light source is the fluorescent lamp or not, based on the result of detecting the flicker generated on the screen under the fluorescent lamp. Accordingly, the estimation precision can increase and the white balance can be suitably adjusted. In addition, in a method of detecting the flicker, at least one of the color signals of the image signal and the brightness signal obtained from the image signal is integrated over at least one horizontal period, the integration value or the difference between the integrations values of adjacent fields or frames is normalized, spectrum after the normalization is extracted, and the flicker component is estimated from the spectrum. Accordingly, it is possible to precisely detect the flicker by a simple signal process, regardless of the kind of the fluorescent lamp, the image signal level, or the subject, without using a light receiving device for detecting the flicker. Accordingly, the precision for estimating the light source more increases and thus a high-quality image in which the white balance is adequately adjusted can be obtained.

Although, in the above-described embodiment, the process of adjusting the control value of the white balance based on the flicker detecting result is described, the present invention is not limited to the white balance. For example, the present invention is applicable to various kinds of color balance control process such as a process of linearly converting the color signal of each channel using a matrix coefficient to obtain color reproduction suitable for the photographing light source.

In addition, the present invention is applicable to a case where the other XY address scanning type image pickup device such as a MOS image sensor other than the CMOS image sensor is used as the image pickup device. Furthermore, the present invention is applicable to apparatuses such as various image pickup apparatuses using the XY address scanning type image pickup device or a mobile telephone or a personal digital assistants (PDA) including the image pickup function.

In addition, the present invention is, for example, applicable to an image process apparatus which performs a process on a pickup image using a small-sized camera for TV telephone or game software connected to a personal computer (PC) or a process for correcting the picked-up image.

The above-described process function can be realized by a computer. In this case, a program, in which the process functions of the apparatus (functions corresponding to the flicker detecting unit 42, the parameter generating unit 51, and the amplifier gain setting unit 52) are described, is provided. By executing the program using the computer, the process function is realized on the computer. The program for describing the process functions may be recorded in a computer-readable recording medium. The computer-readable recording medium includes a magnetic recording apparatus, an optical disc, an optical magnetic disc, and a solid state memory.

When the program is distributed, for example, a mobile recording medium such as an optical disc or a solid state memory having the program thereon is sold. In addition, the program may be stored in a storage device of a server computer and transmitted from the server computer to the other computer over a network.

The computer for executing the program stores the program recorded in the mobile recording medium or the program transmitted from the server computer in its storage device. In addition, the computer reads the program from its storage device and executes the process according to the program. The computer may directly read the program from the mobile recording medium and execute the process according to the program. In addition, the computer may execute the process according to the program received whenever the program is transmitted from the server computer.

It should be understood by those skilled in the art that various modifications, combinations, sub-combinations and alterations may occur depending on design requirements and other factors insofar as they are within the scope of the appended claims or the equivalents thereof.

What is claimed is:

1. An image process apparatus for processing a color image signal, comprising:
    an integration unit integrating at least one of each of color signals of the color image signal or a brightness signal obtained from the color image signal over at least one horizontal period;
    a normalization unit normalizing an integration value obtained by the integration unit and a difference between the integration values of adjacent fields or frames obtained by the integration unit;
    a frequency analysis unit extracting spectrum of output values of the normalization unit;
    a flicker component estimating unit estimating a flicker component from the spectrum extracted by the frequency analysis unit;
    an index generating unit calculating an index representing a probability that a photographing light source is a fluorescent lamp, and a difference between a theoretical difference value and an actual difference value between initial phase components of adjacent fields or frames from the flicker component estimating unit; and
    a color balance control unit configured to:
        calculate a color balance control value of the color image signal according to the index from the index generating unit and a weighted coefficient interpolated between a plurality of control target points for a fluorescent lamp area and a plurality of control target points to determine a final control target point, wherein
            the weighted coefficient is based on the probability that the light source is a fluorescent lamp;
            the fluorescent lamp area is an area in which the probability that the light source is a fluorescent lamp is high; and
            the fluorescent lamp area is previously stored in the color balance control unit;
        determine whether the color image signal is in the fluorescent lamp area; and
        update held value of white balance control gains based on the calculated color balance control value, in response to determining that the color image signal is in the fluorescent lamp area.

2. The image process apparatus according to claim 1, wherein the flicker component estimating unit calculates an initial phase component of the flicker component from the spectrum extracted by the frequency analysis unit.

3. The image process apparatus according to claim 1, wherein the color balance control unit compares the index from the index generating unit with a predetermined threshold value, determines whether the photographing light source is the fluorescent lamp or not, and calculates the color balance control value according to the determined result.

4. The image process apparatus according to claim 1, wherein the color balance control unit previously holds ranges of the color balance control value depending on whether the light source is the fluorescent lamp or not and restricts the output color balance control value within a range of a light source to which the photographing light source belongs, based on the index from the index generating unit.

5. The image process apparatus according to claim 1, wherein the color balance control unit previously holds a plurality of color balance control values depending on whether the light source is the fluorescent lamp or not, selects at least one control value of a light source to which the photographing light source belongs from the held control values, based on the index from the index generating unit, and extracts the output control value based on the selected control value.

6. An image pickup apparatus for picking up an image using an XY address scanning type solid-state image pickup device, comprising:
   an integration unit integrating at least one of each of color signals of a color image signal obtained by picking up the image or a brightness signal obtained from the color image signal over at least one horizontal period;
   a normalization unit normalizing an integration value obtained by the integration unit and a difference between the integration values of adjacent fields or frames obtained by the integration unit;
   a frequency analysis unit extracting spectrum of output values of the normalization unit;
   an estimating unit estimating a flicker component from the spectrum extracted by the frequency analysis unit;
   an index generating unit calculating an index representing a probability that a photographing light source is a fluorescent lamp, and a difference between a theoretical difference value and an actual difference value between initial phase components of adjacent fields or frames from the flicker component estimating unit; and
   a color balance control unit configured to:
       calculate a color balance control value of the color image signal according to the index from the index generating unit and a weighted coefficient interpolated between a plurality of control target points for a fluorescent lamp area and a plurality of control target points to determine a final control target point, wherein
           the weighted coefficient is based on the probability that the light source is a fluorescent lamp;
           the fluorescent lamp area is an area in which the probability that the light source is a fluorescent lamp is high; and
           the fluorescent lamp area is previously stored in the color balance control unit;
       determine whether the color image signal is in the fluorescent lamp area; and
       update held value of white balance control gains based on the calculated color balance control value, in response to determining that the color image signal is in the fluorescent lamp area.

7. An image process method of adjusting color signals of a color image signal, comprising the steps of:
   allowing an integration unit to integrate at least one of each of the color signals of the color image signal or a brightness signal obtained from the color image signal over at least one horizontal period;
   allowing a normalization unit to normalize an integration value obtained by the integration unit and a difference between the integration values of adjacent fields or frames obtained by the integration unit;
   allowing a frequency analysis unit to extract spectrum of output values of the normalization unit;
   allowing a flicker component estimating unit to estimate a flicker component from the spectrum extracted by the frequency analysis unit;
   allowing an index generating unit to calculate an index representing a probability that a photographing light source is a fluorescent lamp, and a difference between a theoretical difference value and an actual difference value between initial phase components of adjacent fields or frames from the flicker component estimating unit; and
   allowing a color balance control unit to:
       calculate a color balance control value of the color image signal according to the index from the index generating unit and a weighted coefficient interpolated between a plurality of control target points for a fluorescent lamp area and a plurality of control target points to determine a final control target point, wherein
           the weighted coefficient is based on the probability that the light source is a fluorescent lamp;
           the fluorescent lamp area is an area in which the probability that the light source is a fluorescent lamp is high; and
           the fluorescent lamp area is previously stored in the color balance control unit;
       determine whether the color image signal is in the fluorescent lamp area; and
       update held value of white balance control gains based on the calculated color balance control value, in response to determining that the color image signal is in the fluorescent lamp area.

8. An image process program embodied in a non-transitory computer readable storage device for executing a color adjustment process of a color image signal on a computer, the computer is allowed to serve as:
   an integration unit integrating at least one of each of color signals of the color image signal or a brightness signal obtained from the color image signal over at least one horizontal period;
   a normalization unit normalizing an integration value obtained by the integration unit and a difference between the integration values of adjacent fields or frames obtained by the integration unit;
   a frequency analysis unit extracting spectrum of output values of the normalization unit;
   a flicker component estimating unit estimating a flicker component from the spectrum extracted by the frequency analysis unit;
   an index generating unit calculating an index representing a probability that a photographing light source is a fluorescent lamp, and a difference between a theoretical difference value and an actual difference value between initial phase components of adjacent fields or frames from the flicker component estimating unit; and
   a color balance control unit configured to:
       calculate a color balance control value of the color image signal according to the index from the index generating unit and a weighted coefficient interpolated between a plurality of control target points for a fluorescent lamp area and a plurality of control target points to determine a final control target point, wherein
           the weighted coefficient is based on the probability that the light source is a fluorescent lamp;
           the fluorescent lamp area is an area in which the probability that the light source is a fluorescent lamp is high; and
           the fluorescent lamp area is previously stored in the color balance control unit;
       determine whether the color image signal is in the fluorescent lamp area; and
       update held value of white balance control gains based on the calculated color balance control value, in response to determining that the color image signal is in the fluorescent lamp area.

\* \* \* \* \*